United States Patent [19]

Takeguchi et al.

[11] Patent Number: 5,999,235
[45] Date of Patent: Dec. 7, 1999

[54] LIQUID CRYSTAL DISPLAYING APPARATUS AND METHOD OF MANUFACTURING TFT ARRAY

[75] Inventors: Tooru Takeguchi; Kouji Yabushita; Masami Hayashi, all of Tokyo, Japan

[73] Assignee: Mitsubishi Denki Kabushiki Kaisha, Tokyo, Japan

[21] Appl. No.: 08/879,617

[22] Filed: Jun. 20, 1997

[30]     Foreign Application Priority Data

Dec. 17, 1996  [JP]  Japan .................................... 8-336452

[51] Int. Cl.⁶ ....................................................... G02F 1/136
[52] U.S. Cl. ............................................. 349/42; 438/745
[58] Field of Search ................................ 349/42; 438/745

[56]           References Cited
          FOREIGN PATENT DOCUMENTS

| 57-125921 | 8/1982 | Japan . |
| 60-129781 | 7/1985 | Japan . |
| 6-268218 | 9/1994 | Japan . |
| 7-113726 | 12/1995 | Japan . |

*Primary Examiner*—Robert H. Kim
*Attorney, Agent, or Firm*—Oblon, Spivak, McClelland, Maier & Neustadt, P.C.

[57]           ABSTRACT

A method of manufacturing TFT array substrate comprises forming a control electrode and a control electrode line on a transparent insulating substrate, forming an insulating film on the control electrode and the control electrode line, forming a semiconductor layer through the insulating film on the control electrode and the control electrode line, forming a transparent conductive film on the insulating film, forming a picture element electrode by etching the transparent conductive film with an etchant including concentrated hydrochloric acid mixed with concentrated sulfuric acid and having water as main component, and forming a pair of electrodes on the semiconductor layer.

9 Claims, 4 Drawing Sheets

LIQUID CRYSTAL DISPLAYING APPARATUS AND METHOD OF MANUFACTURING TFT ARRAY

BACKGROUND OF THE INVENTION

The present invention relates to liquid crystal displaying apparatus and method of manufacturing a TFT array panel to be used for the same.

Recently the TFT type liquid crystal displaying apparatus with thin film transistor (hereinafter referred to as TFT) mounted on it requires improvements of aperture ratio as well as higher definition and larger image plane.

FIG. 6 is a sectional view showing TFT array substrate of the conventional, general TFT type liquid crystal displaying apparatus. The TFT array substrate is composed of a gate electrode 2, a gate insulating film 3, a semiconductor layer 4 made of amorphous silicon film, an ohmic contact layer 5 made of n+ type amorphous silicon film, a picture element electrode 9 composed of transparent conductive film, a source electrode 10, a drain electrode 11, and a passivation film 14 are formed sequentially on a transparent insulating substrate 1 such as glass substrate or the like. Gate line (not shown) for applying voltage on the gate electrode 2 and a gate electrode 2 to be formed simultaneously with it, or source line (not shown) for applying voltage on the source electrode 10, a drain electrode 11 and a source electrode 10 to be formed simultaneously with them are formed with the use of metal such as Cr, Ti, Ta or the like, which has high resistivity of 20 ΩQ.cm through 200 µΩ.cm.

It is required to form the gate line and gate electrode 2, and source line, source electrode 10 and drain electrode 11 of material with lower resistivity so as to make the pattern finer because of higher resolution and higher aperture ratio of the liquid crystal displaying apparatus, although the gate line and the gate electrode 2, and the source line, the source electrode 10 and the drain electrode 11 are composed of the use of metal with high resistivity in the conventional TFT type liquid crystal displaying apparatus as described above.

For such a reason, Al or alloy with Al as chief component, which is lower in resistivity, lower in cost and easier to make films and to do finer patterning processes is used as material composed of the gate line and the gate electrode 2, and the source line, the source electrode 10 and the drain electrode 11.

But when the Al or the alloy chiefly made of Al is used as the material of the gate line and the gate electrode 2, there is a problem in that etchant including either of hydrochloric acid and ferric chloride, hydrochloric acid and nitric acid, hydriodic acid to be used for patterning of ITO (Indium Tin Oxide) film which is a transparent conductive film for defining a pixel electrode 9 is penetrated through the defective portion of the gate insulating film 3, dust taken into the gate insulating film 3, or the like to corrode the Al for disconnecting the gate line.

For example, as a conventionally proposed method of preventing the corrosion of Al comprising the gate electrode and the gate line by etchant with respect to ITO film, Japanese Unexamined Patent Publication No. 113726/1995 proposes a method of forming the two-layered film structure of Cr/Al having Cr film, protective film, formed on Al film, and Japanese Unexamined Patent Publication No. 268218/1994 proposes a method of forming the gate line and the gate electrode with the use of the two-layered film structure of $Al_2O_3/Al$ having alumina on the surface with Al film being anodic oxidized.

Also, Japanese Unexamined Patent Publication No. 129781/1985 proposes a method of preventing the corrosion of Al using solutions of hydrochloric acid or ferric chloride as etchant to be used for patterning of ITO film.

On the other hand, in TFT array composed of a picture element electrode as an uppermost layer, it is required to form protective film such as Cr film or the like on the Al film or the Al alloy film, because a problem is caused in that the etchant to be used in the patterning of ITO film comprising the picture element electrode as in the gate line and the gate electrode described above, is penetrated through interlayer insulator formed between the source line, the source electrode and the drain electrode and ITO film to corrode Al comprising the source line, the source electrode and the drain electrode, when Al film or Al alloy film is used on the surface layer of the source line, the source electrode and the drain electrode which become the lower layer of the picture element electrode through the interlayer insulator.

As described above, though conventionally proposed methods are effective as a method of forming the gate line and the gate electrode using the material with low resistivity without corrosion by etchant to be used in the patterning of ITO film comprising the picture element electrode in TFT array, for example, methods of forming protective films such as Cr film, alumina film anodic oxidized or the like on Al film with the use of Al film as the gate line and the gate electrode had problems in that the forming step of Cr film, the anodic oxidizing step of the Al were required to increase the number of manufacturing steps, further causing an inferior pattern because of sticking of dusts during the halfway step operation so as to reduce the productivity and the yield.

Also, a method of using sulfuric acid solution as etchant for effecting the patterning of ITO film had problems in that the productivity was lower because of lower etching rate of ITO with sulfuric acid solution.

Also, the same problems were caused when the material with low resistivity was used as main components without corrosion by etchant to be used for patterning of the ITO film even in the source line, the source electrode and the drain electrode in TFT array in the construction where the picture element electrode was the uppermost layer.

Accordingly, an object of the invention is to provide a method of manufacturing TFT array which can prevent the corrosion of the material with low resistivity used on the surface layer with the etchant of the ITO film comprising the picture element electrode without reduction in the formation of protective film or in productivity with use of etchant for ITO film low in etching rate even with the use of material with low resistivity in the top layer of the gate line and the gate electrode or the source line, the source electrode and the drain electrode.

Also, another object of the invention is to provide a liquid crystal displaying apparatus, where the pattern is made narrower and the aperture ratio is made higher by using the material with low resistivity as main components the gate line and the gate electrode or the source line, the source electrode and the drain electrode.

SUMMARY OF THE INVENTION

A method of manufacturing a TFT array substrate of the invention comprises a step of forming a gate electrode and a gate line on a transparent insulating substrate, a step of forming an insulating film on the gate electrode and the gate line, a step of forming the semiconductor layer through the insulating film on the gate line, a step electrode, a step for forming the transparent conductive film on a insulating film, a step of forming photosensitive resists on the transparent conductive film, a step of forming picture element electrode by etching the transparent conductive film with etchant where the concentrated hydrochloric acid is mixed with concentrated sulfuric acid having water as main component, a step for forming a pair of electrodes for composing a semiconductor element with a semiconductor layer.

Also, the top layer of the gate electrode and the gate line is formed of conductor with low in resistivity.

Also, the method comprises a step of forming a gate electrode and gate line on a transparent insulating substrate, a step of forming an insulating film on the gate electrode and the gate line, a step of forming a semiconductor layer through the insulating film on the gate electrode, a step for forming a pair of electrodes comprising a semiconductor element with a semiconductor layer, a step of forming a protective film on a pair of electrodes, a step of forming a transparent conductive film on the protective film, a step of forming photosensitive resists on the transparent conductive film, a step of forming a picture element electrode by etching the transparent conductive film with etchant where the concentrated hydrochloric acid is mixed with concentrated sulfuric acid with water as main component.

Also, the surface of a pair of electrodes and the electrode bus-line is composed of conductor with low resistivity.

Further, the transparent conductive film is composed of ITO.

Also, etchant is a mixed liquid where water of 0 or more and 3 or lower in volume ratio with respect to concentrated hydrochloric acid 1, and concentrated sulfuric acid of 0.005 or more and 1 or lower in volume ratio are added.

Further, the etching of the transparent conductive film is carried out with the temperature of etchant being adjusted to 70° C. or lower.

Also, the liquid crystal displaying apparatus of the invention is provided with TFT array formed by one of the above methods, and an opposite substrate having opposite electrode for grasping the liquid crystal material, together with the TFT array.

DETAILED DESCRIPTION

Embodiment 1

Figure 1A:
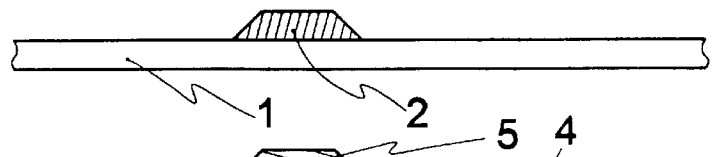
FIGS. 1(a) to 1(f) are each sectional view showing steps of manufacturing the TFT array in accordance with Embodiment 1 of the invention.

A TFT array in one embodiment of the invention and a liquid crystal displaying apparatus using a TFT array will be described hereinafter. FIG. 1 is a sectional view showing a step of manufacturing the TFT array in embodiment 1 of the invention. Referring to the drawing, reference numeral 1 is a transparent insulating substrate such as glass substrate or the like, reference numeral 2 is a gate electrode formed on the transparent insulating substrate 1, reference numeral 3 is a gate insulating film formed on the gate electrode 2, reference numeral 4 is a semiconductor layer formed on the gate electrode 2 through the gate insulating film 3, reference numeral 5 is an ohmic contact layer formed on the semiconductor layer 4, reference numeral 6 is an ITO film, reference numeral 7 is photosensitive resist, reference numeral 8 is an etchant with respect to the ITO film 6, reference numeral 9 is a picture element electrode formed by patterning of the ITO film 6.

Figure 1B:
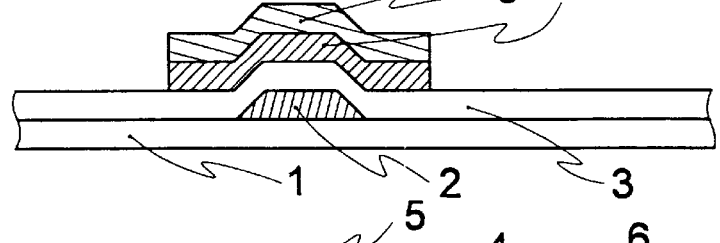

A method of manufacturing TFT array in the present embodiment will be described hereinafter. At first, as shown in FIG. 1(a), Al film (hereinafter referred to as Al-0.2 wt % Cu) including Cu 0.2% by weight of 300 nm in thickness is formed by a sputtering method on the surface of the transparent insulating substrate, and thereafter, the gate electrode 2 and the gate line (not shown) are formed by patterning operation with use of photosensitive resists formed on the photo lithography process. As shown in FIG. 1(b), silicon nitride film of about 400 nm in thickness composed of the gate insulating film 3, amorphous silicon film of about 150 nm in thickness, n$^+$type amorphous silicon film with impurity of about 30 nm in thickness being doped into it are sequentially formed by a plasma CVD method and then, the amorphous silicon film and the n$^+$type amorphous silicon film are patterned at the same time with the use of photosensitive resists formed by the photo lithography process to form the semiconductor layer 4 and the ohmic contact layer 5 in the position above the gate electrode 2.

Figure 1C:
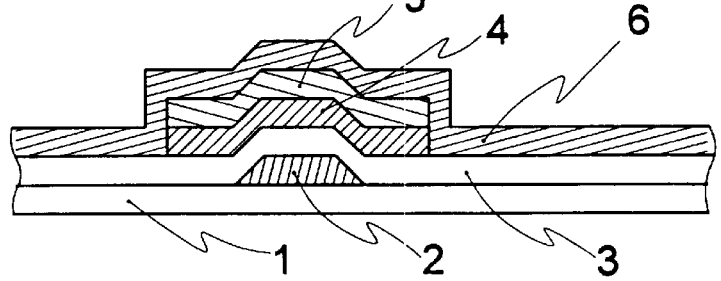
Figure 1D:
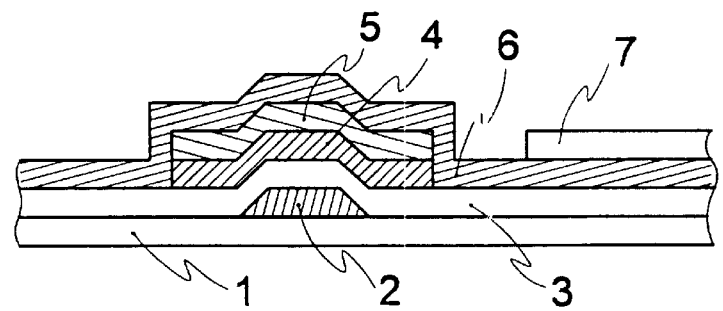
Figure 1E:
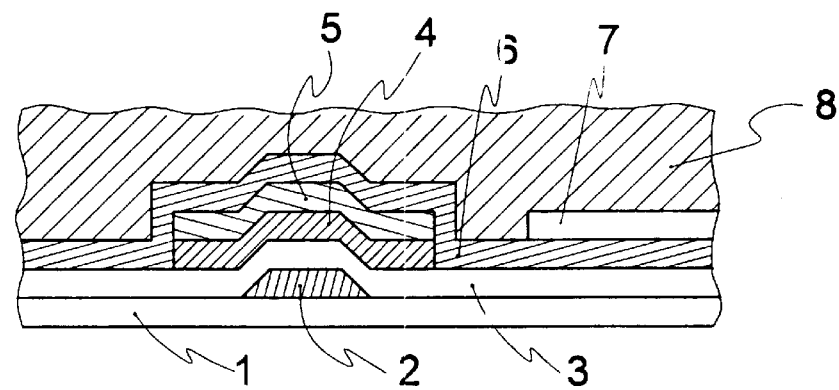
Figure 1F:
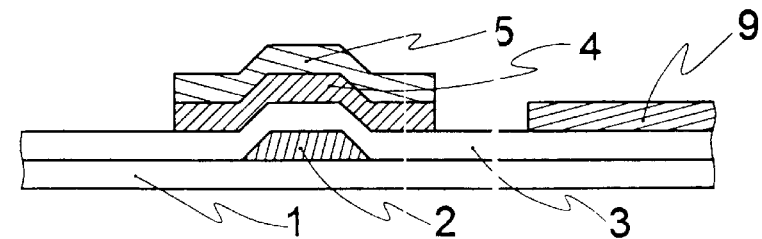

Then, as shown in FIG. 1(c), the ITO film 6 of about 100 nm in thickness is formed by the sputtering method as the transparent conductive film. Then, as shown in FIG. 1(d), a photosensitive resist is applied by about 1 μm to expose, develop for forming resist patterns 7. Then, as shown in FIG. 1(e), the transparent insulating substrate 1 is dipped for 150 seconds into the etchant 8, raised in temperature to 60° C., where water 1 and concentrated sulfuric acid 0.1 in volume ratio are mixed with concentrated hydrochloric acid 1 to remove in etching a garbage portion of the ITO film. Then, as shown in FIG. 1(f), the photosensitive resist 7 is removed to form picture element electrode 9 consisting of the ITO film 6. At this time, the film composed chiefly of Al for forming the gate line and the gate electrode 2 is not corroded by etchant 8.

Then, a passivation film is formed on the entire face (not shown) after the formation of the source electrode and the drain electrode electrically connected with the picture element electrode 9.

An alignment film is formed on the surface of the TFT array substrate formed in this manner and of the opposite substrate with a light shield layer, an overcoat layer and an opposite electrode being formed on the other transparent insulating substrate and then, are opposed. The liquid crystal is injected between them to seal with a sealing agent and a light polarizer is positioned on the outside of the opposite TFT array substrate and the opposite substrate so as to construct the liquid crystal panel.

The gate line and the gate electrode 2 may be formed with the use of Mo film or an alloy film chiefly made of Mo with low resistivity, instead of film with Al being chiefly component.

Also, as the liquid composition of the etchant 8 with respect to ITO film 6 and the etching conditions, it is required that process conditions do not change suddenly with respect to the liquid composition change due to liquid deterioration or the like, and the side etch amount of the etching pattern are required.

Figure 2:
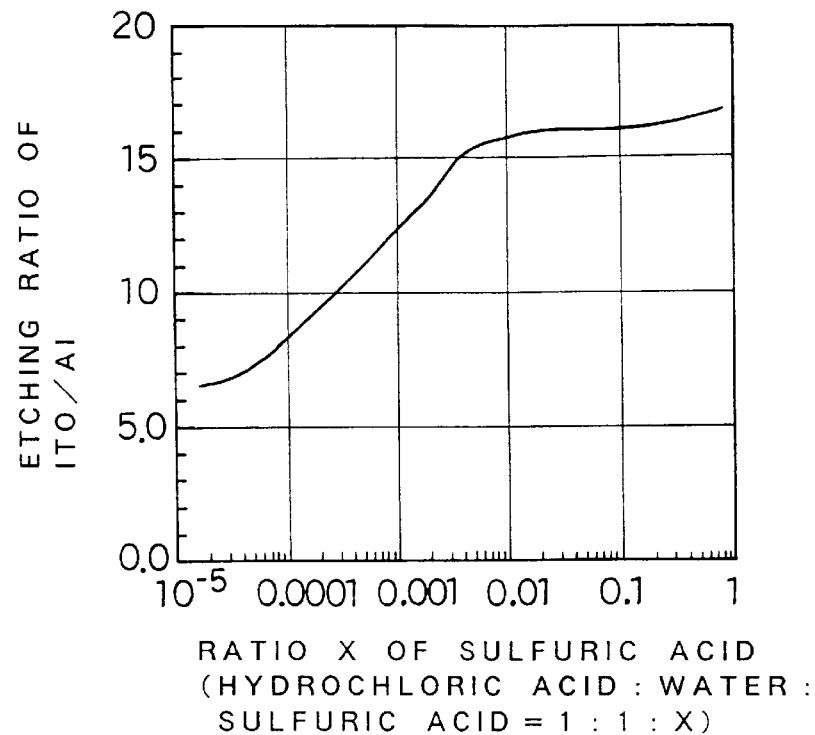
FIG. 2 is a graph showing the relationship between ratio of concentrated sulfuric acid to concentrated hydrochloric acid in etchant with respect to ITO film and etching ratio of the ITO with respect to Al.

FIG. 2 is a graph showing the relationship between ratio of concentrated sulfuric acid to concentrated hydrochloric acid 1 in the etchant 8 with respect to ITO film 6, and an etching ratio of the ITO with respect to Al. As shown in FIG. 2, it is required to make the volume ratio of concentrated sulfuric acid 0.005 or more, considering the stability of the liquid deterioration process, because the variation amount of the etching rate ratio of the ITO/Al to change in the ratio of concentrated sulfuric acid under 0.005 or lower in volume ratio of concentrated sulfuric acid to concentrated hydrochloric acid 1, becomes large. Also, when the volume ratio of concentrated sulfuric acid to concentrated hydrochloric acid 1 exceeds 1, it is preferable to make the ratio of concentrated sulfric acid 1 or lower, because the etching pattern of the ITO film 6 becomes worse in accuracy.

Figure 3:
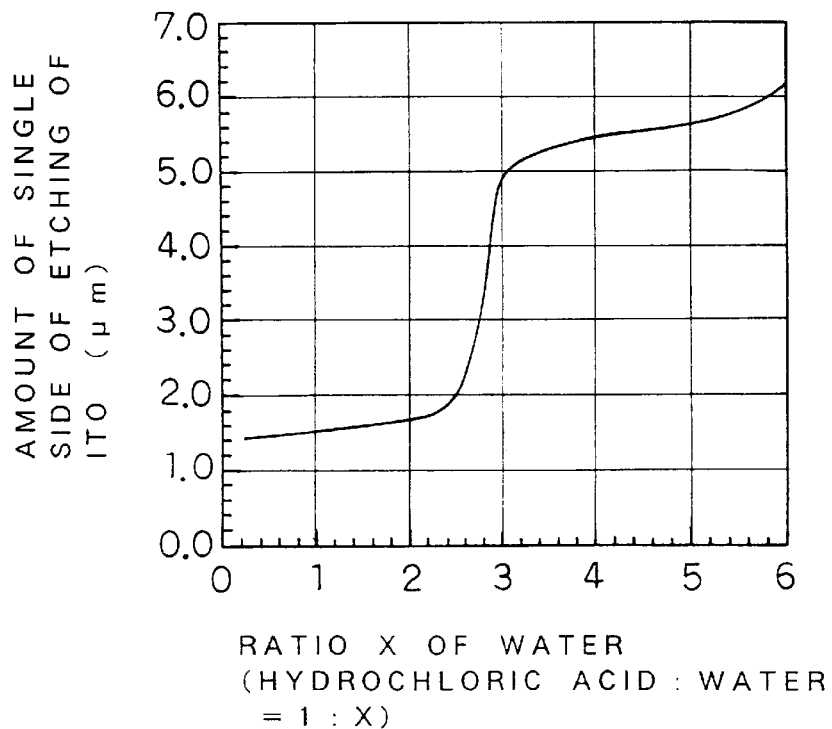
FIG. 3 is a graph showing the relationship between volume ratio of water to concentrated hydrochloric acid in etchant and side etching amount of the etching pattern.

Also, FIG. 3 is a graph showing the relationship between the volume ratio of water to concentrated hydrochloric acid 1 in the etchant 8 and the side etch amount on a single side of the etching pattern of the ITO film 6. As shown in FIG. 3, it is required to make the volume ratio of the water 3 or lower, because the side etching amount of the etching pattern of the ITO film 6 becomes larger with the volume ratio of water to hydrochloric acid being 3 to 1 or more.

Figure 4:
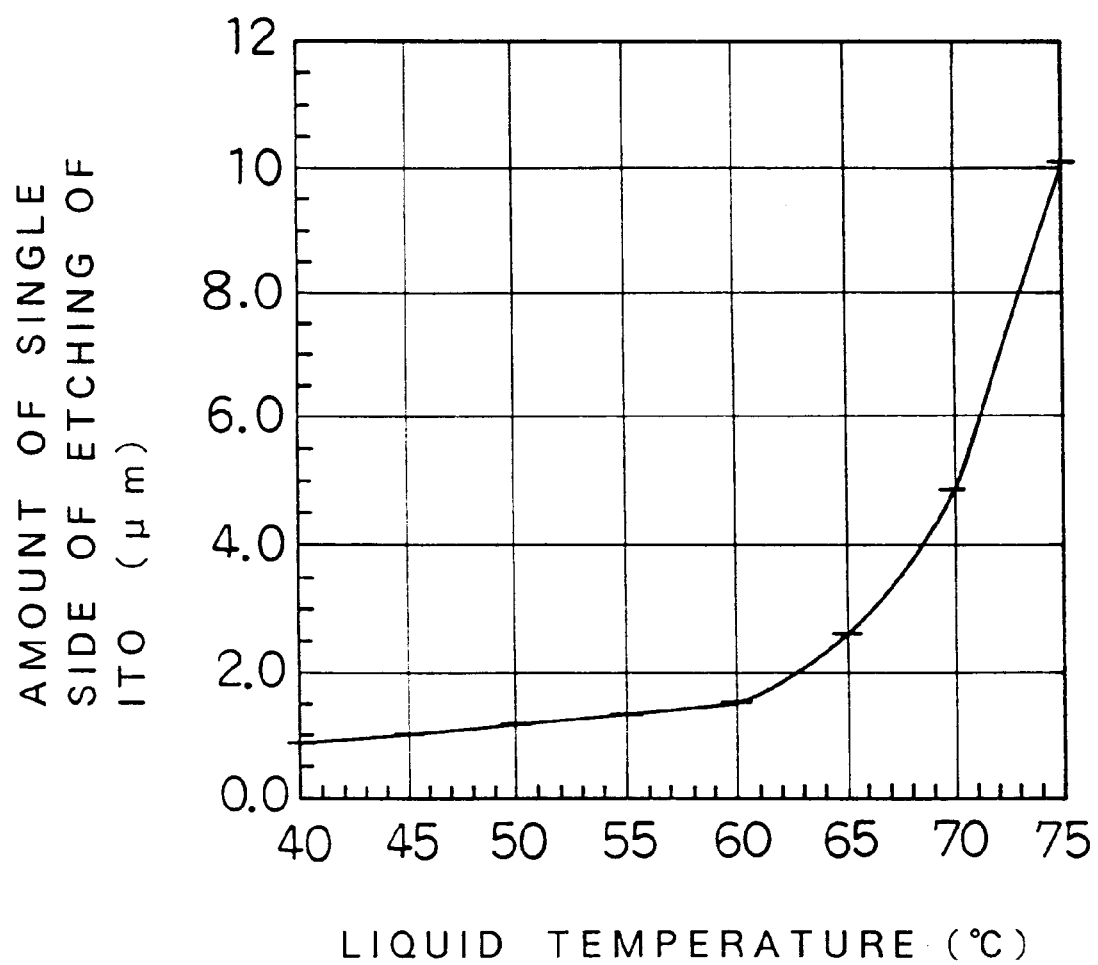
FIG. 4 is a graph showing the relationship between liquid temperatue of etchant with respect to ITO film and side etching amount of etching patern.

Also, FIG. 4 is a graph showing the relationship between the liquid temperature of the etchant 8 at the etching time with respect to the ITO film 6 and the side etching amount on the single side of the etching pattern of the ITO film 6. As shown in FIG. 4, it is necessary to make the liquid temperature 70° C. or lower, because the side etching amount of the etching pattern of the ITO film 6 becomes larger when the liquid temperature of the etchant exceeds 70° C. But it is necessary to decide the liquid temperature, considering that the etching rate becomes smaller as etchant temperature becomes lower.

As described above, the liquid composition range of the etchant 8 with respect to the ITO film 6 and the etching conditions are preferable to decide from the etching rate to be desired within the range of 70° C. or lower in liquid temperature with the use of the liquid composition where water of 0 or more and 3 or lower, concentrated sulfuric acid of 0.005 or more and 1 or lower in volume ratio are mixed with the concentrated hydrochloric acid 1.

The corrosion by etchant 8 of the gate line and the ITO film 6 of the gate electrode 2 formed with the use of material with low resistivity can be prevented without causing the reduction in the etching rate and the reduction in the productivity such as formation of the protective film onto the bus-line by the use of liquid where concentrated sulfuric acid is mixed with the concentrated hydrochloric acid and water as chief component as the etchant 8 with respect to the ITO film 6 comprising the picture element electrode 9.

Also, a liquid crystal displaying apparatus can be obtained where the pattern can be made narrower, and the aperture ratio is made higher. The gate line and the gate electrode are constructed with the material with low resistivity being a chief component.

Embodiment 2

Figure 5:
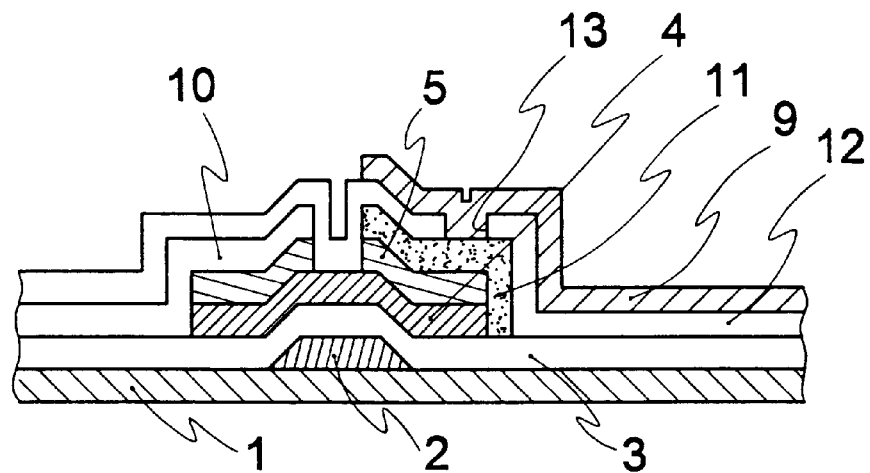
FIG. 5 is a sectional view of a TFT array in accordance with Embodiment 2 of the invention.
Figure 6:
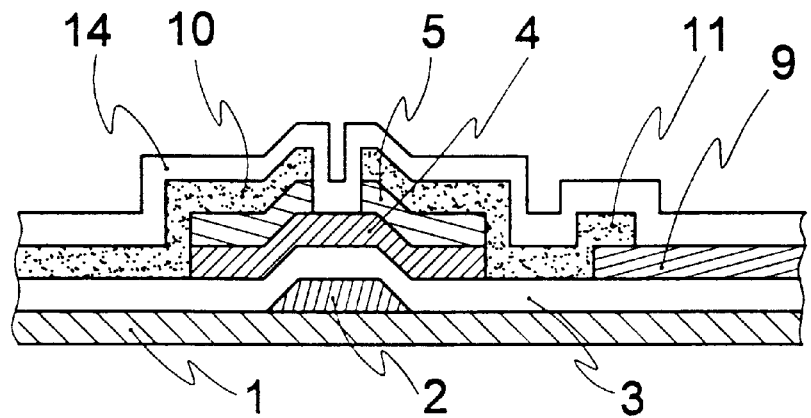
FIG. 6 is a sectional view showing conventional TFT.

FIG. 5 is a sectional view of a TFT array of a liquid crystal displaying apparatus showing Embodiment 2 of the invention. Referring to drawing, reference numerals 10 and 11 are a source electrode and a drain electrode, respectively, provided with a source line formed on the ohmic contact layer 5, reference numeral 12 is a insulation film formed on the source electrode 10 and the drain electrode 11, reference numeral 13 is a contact hole formed in insulation film 12 on the drain electrode 11. The parts in the Embodiment 2 in FIG. 1 same as those in Embodiment 1 are omitted in description.

Then, a method of manufacturing TFT array in this embodiment will be described. At first, as shown in FIG. 1(a), Al-0.2 wt % Cu film of 300 nm in film thickness is formed on the surface of the transparent insulating substrate 1, and then, the gate electrode 2 and the gate line (not shown) are formed by a patterning operation with the use of resists formed by the photolithography process. The silicon nitride of about 400 nm in thickness comprising the gate insulating film 3, amorphous silicon film of about 150 nm in thickness, n$^+$type amorphous silicon film with impurity of about 30 nm in thickness being doped into it are sequentially formed by a plasma CVD method and then, the amorphous silicon film and the n$^+$type amorphous silicon film are patterned at the same time with the use of photosensitive resists formed by the photolithography process to form the semiconductor layer 4 and the ohmic contact layer 5 in the position above the gate electrode 2.

Then, after the sequential formation of Mo film and Al-0.2 wt % Cu film by the sputtering method, a patterning operation is effected with the photosensitive resists formed by the photolithography process to form the source electrode 10, the drain electrode 11 and the source line (not shown). Then, the silicon nitride film is formed, by about 400 nm by a plasma CVD process, as the interlayer insulator 12 to form the contact hole 13 on the drain electrode 11 with the use of photosensitive resists formed by the photo lithography process.

Then, the ITO film 6 of about 100 nm in thickness is formed by the sputtering method as the transparent conductive film. Then, a photosensitive resist is applied by about 1 μm to expose, develop for forming etching resists 7. Then, the transparent insulating substrate 1 is dipped for 150 seconds into etchant raised in temperature to 60° C., where water 1 and concentrated sulfuric acid 0.1 is mixed in volume ratio are mixed with concentrated hydrochloric acid to remove in etching the ITO film of a garbage portion. Then, the photosensitive resist 7 is removed to form a picture element electrode 9 composed of the ITO film 6. At this time, Al is not corroded by the etchant of ITO film although the film composed chiefly of Al is used for the surface layer of the source line, the source electrode 10 and the drain electrode 11.

Finally, a passivation film is formed on the entire face (not shown).

An alignment film is formed on the surface of the TFT array substrate formed in this manner and of the opposite basic plate with a light shield layer, an overcoat layer and an opposite basic plate being formed on the other transparent insulating substrate and then, is opposed. The liquid crystal is injected between them to seal with a sealing agent, and a light polarizer is positioned on the outside of the opposite TFT array and the opposite substrate so as to construct the liquid crystal panel.

The surface layer of the source line, the source electrode 10 and the drain electrode 11 gate line and the gate electrode 2 may be formed with the use of a Mo film or an alloy film chiefly made of Mo with low resistivity, instead of film with Al being chiefly component.

The gate line and the gate electrode 2 may be formed with Mo film or an alloy film chiefly made of Mo with low resistivity, instead of film with Al being chiefly component.

The liquid composition of the etchant with respect to ITO film and etching conditions are preferable to decide from the etching rate to be within the range of 70° C. or lower in liquid temperature with use of the liquid composition where water of 0 or more and 3 or lower, concentrated sulfuric acid of 0.005 or more and 1 or lower to the concentrated hydrochloric acid 1 are mixed in volume ratio as in Embodiment 1.

The corrosion by the etchant 9 with respect to the ITO film of the source line, the source electrode 10 and the drain electrode 11 formed with use of material with low resistivity as the surface layer can be prevented without causing the reduction in the etching rate and the reduction of the productivity such as formation of the protective film onto the bus-line portion by the use of liquid, where concentrated hydrochloric acid and water as chief component are mixed with the concentrated sulfuric acid, as the etchant with respect to ITO film comprising the picture element electrode.

Also, a liquid crystal displaying apparatus can be obtained where the patterns are made narrower and the aperture ratio is higher, with the source line, the source electrode 10 and the drain electrode 11 being constructed with the use of material with low resistivity as a chief component.

As described above, according to the invention, in the TFT array, where the picture element electrode of ITO film is formed on the upper layer of the gate line and the gate electrode through the gate insulating film, where a picture element electrode of ITO film is formed on the upper layer of the source line, the source electrode and the drain electrode through the interlayer insulator, the corrosion by the etchant with respect to ITO film of the material with low resistivity can be prevented without causing the reduction of the etching rate of ITO film and the reduction of the productivity such as formation of the protective film onto the bus-line portion by the use of liquid, where concentrated sulfuric acid is mixed with the concentrated hydrochloric acid and water as chief component, as the etchant 8 with respect to the ITO film 6 comprising the picture element electrode.

Also, a liquid crystal displaying apparatus can be obtained where the pattern can be made narrower, and the aperture ratio is made higher, with the gate line and the gate electrode or the source line, the source electrode and the drain electrode being composed of material with low resistivity as main component.

Though several embodiments of the present invention described above, it is to be understood that the present invention is not limited to the above-mentioned embodiments, and various changes and modifications may be made in the invention without departing from the spirit and scope thereof.

What we claim is:

1. A method of manufacturing a TFT array substrate, comprising:

forming a control electrode and a control electrode line on a transparent insulating substrate, forming an insulating film on the control electrode and the control electrode line, forming a semiconductor layer through the insulating film on the control electrode, forming a transparent conductive film on the insulating film, forming photosensitive resists on the transparent conductive film, forming a picture element electrode by etching the transparent conductive film with an etchant including hydrochloric acid mixed with a solution of sulfuric acid and water, the volume ratio of water to sulfuric acid in said solution being greater than 1, and forming a pair of electrodes on the semiconductor element with a semiconductor layer.

2. The method of claim 1, wherein the top layers of the control electrode and the control electrode line are respectively formed of a conductor having low resistivity.

3. A method of manufacturing a TFT array substrate comprising:

forming a control electrode and a control electrode line on a transparent insulating substrate, forming an insulating film on the control electrode and the control electrode line, forming a semiconductor layer through the insulating film on the control electrode, forming a pair of electrodes contacting the semiconductor layer, forming a protective film over the pair of electrodes, forming a transparent conductive film on the protective film, forming photosensitive resists on the transparent conductive film, forming a picture element electrode by etching the transparent conductive film with an etchant including hydrochloric acid mixed with a solution of sulfuric acid and water, the volume ratio of water to sulfuric acid in said solution being greater than 1.

4. The method of claim 3, wherein the top surfaces of the pair of electrodes and the electrode line are respectively formed of a conductor having low resistivity.

5. The method of claim 1, wherein the transparent conductive film is formed of indium tin oxide.

6. The method of claim 1 or 3, wherein the transparent conductive film is formed of indium tin oxide.

7. The method of claims 1 or 3, wherein the etchant is a mixed liquid including water having a volume ratio (greater than 0 and less than or equal to 3 with respect to the hydrochloric acid, and the sulfuric acid volume ratio is not smaller than 0.005 or greater than 1 with respect to the hydrochloric acid.

8. The method of claims 1 or 3, wherein the etching of the transparent conductive film is performed with the temperature of etchant being 70° C. or lower.

9. A liquid crystal display apparatus, comprising a TFT array substrate formed by the method of claims 1 or 3, further comprising:

an opposite substrate having an opposite electrode for holding, along with the TFT array substrate, the liquid crystal material.

* * * * *